(12) United States Patent
Openiano

(10) Patent No.: US 11,441,863 B1
(45) Date of Patent: Sep. 13, 2022

(54) UNIVERSAL FIREARM TRACKING SYSTEM

(71) Applicant: Renato Martinez Openiano, Chula Vista, CA (US)

(72) Inventor: Renato Martinez Openiano, Chula Vista, CA (US)

(*) Notice: Subject to any disclaimer, the term of this patent is extended or adjusted under 35 U.S.C. 154(b) by 0 days.

(21) Appl. No.: 17/506,710

(22) Filed: Oct. 21, 2021

Related U.S. Application Data

(60) Provisional application No. 63/258,851, filed on May 29, 2021, provisional application No. 63/258,537, filed on May 10, 2021.

(51) Int. Cl.
*G06F 17/00* (2019.01)
*F41A 17/06* (2006.01)
*G06Q 30/06* (2012.01)

(52) U.S. Cl.
CPC ............ *F41A 17/063* (2013.01); *G06Q 30/06* (2013.01)

(58) Field of Classification Search
CPC .............................. F41A 17/063; G06Q 30/06
USPC ............................................................ 235/375
See application file for complete search history.

(56) References Cited

U.S. PATENT DOCUMENTS

| | | | |
|---|---|---|---|
| 6,256,919 B1* | 7/2001 | Brazeau | F41A 17/44 42/70.11 |
| 10,365,057 B2* | 7/2019 | Black | F41A 17/066 |
| 10,928,150 B2* | 2/2021 | Murphy, II | F41A 17/20 |
| 11,156,419 B1* | 10/2021 | Wang | F41G 1/35 |
| 2012/0062388 A1* | 3/2012 | Wilson | G01S 5/06 705/317 |
| 2016/0116241 A1* | 4/2016 | Efremkina | G08B 21/0261 42/1.01 |
| 2019/0287325 A1* | 9/2019 | Paolo | G07C 9/28 |

* cited by examiner

*Primary Examiner* — Ahshik Kim
(74) *Attorney, Agent, or Firm* — Michael D. Eisenberg

(57) ABSTRACT

A universal firearm tracking system includes a tracking module enclosed in a housing; a cable attached to the housing configured to attach the housing to a firearm; and a hanging tamper-proof warning label connected to a bottom of the housing by a wire. The tracking module includes GPS tracking and RFID Tags.

20 Claims, 14 Drawing Sheets

UNIVERSAL FIREARM TRACKING SYSTEM

CROSS-REFERENCES TO RELATED APPLICATIONS

The present application claims priority from U.S. Provisional Application Ser. No. 63/258,851 filed on May 29, 2021 and U.S. Provisional Application Ser. No. 63/258,537 filed on May 10, 2021, which are hereby incorporated herein by reference in their entirety.

TECHNICAL FIELD

This application generally relates to tracking devices and systems, and more particularly, to a firearm tracking system.

BACKGROUND

Mass shootings that kill thousands of innocent people occur nationwide in the US and all over the world. Authorities including law enforcement seem to be helpless in preventing the mass shooting incidents and putting a stop to these senseless killings of innocent people. Typically, by the time the law enforcers arrive at the scene, it is often already too late. In part this occurs because the legal firearms are not tracked. Existing firearm registries and databases do not provide for firearm tracking system capable of notifying the law enforcement agencies in real-time—the very moment a registered firearm is transported away from this firearm owner's home or registered storage location.

Accordingly, a universal firearm tracking system that may notify the law enforcement agencies when a registered firearm is transported away from the firearm's owner's home or declared storage location is desired.

SUMMARY

An example embodiment provides a universal firearm tracking system that includes a tracking module enclosed in a housing; a cable attached to the housing configured to attach the housing to a firearm; and a hanging tamper-proof warning label connected to a bottom of the housing by a wire. The tracking module includes GPS tracking and RFID Tags.

DETAILED DESCRIPTION

Figure 1:
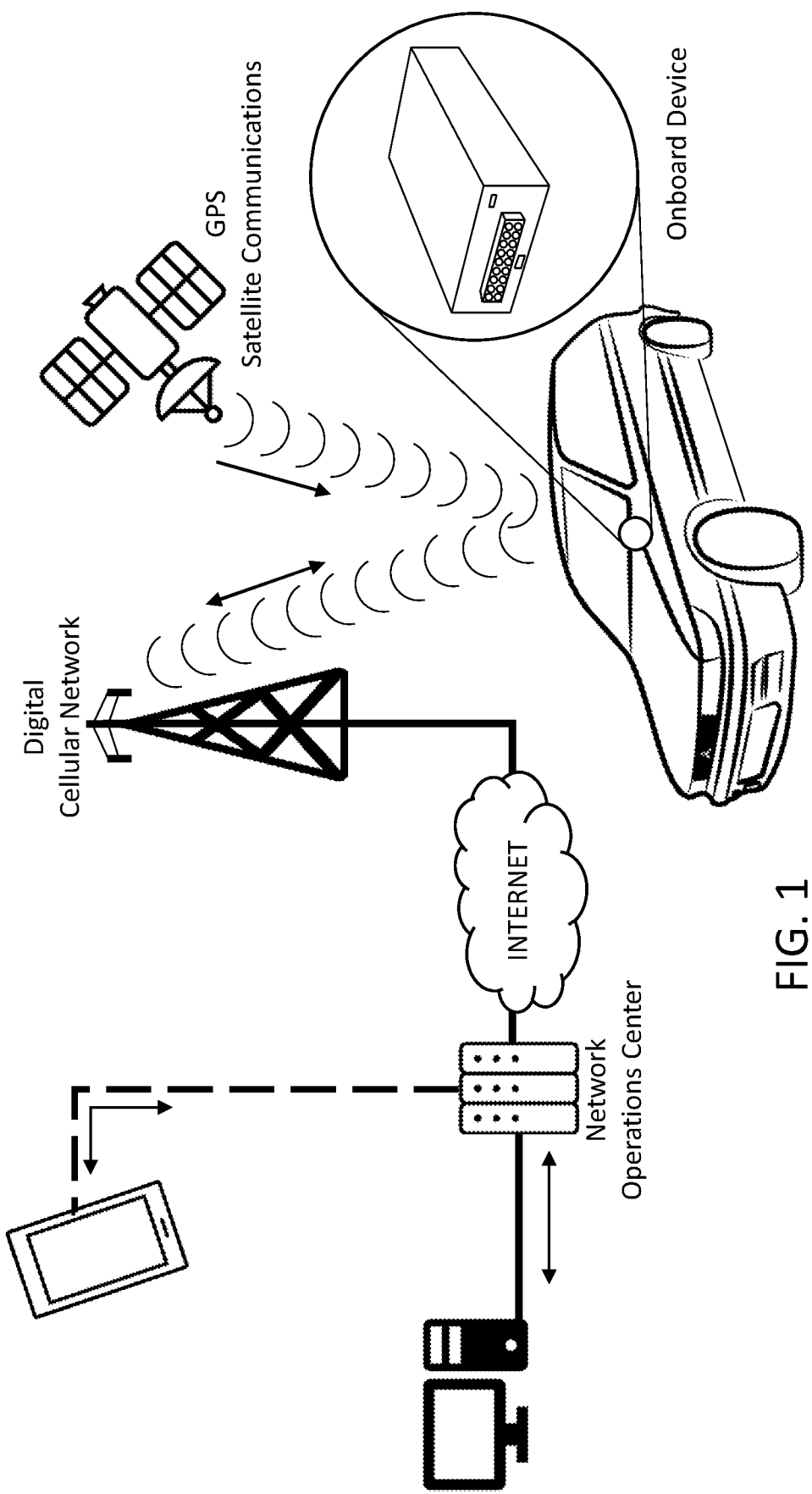
FIG. 1 illustrates an infrastructure that may be employed using the GPS Tracking System, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide system and components, which provide for implementation of a firearm tracking system.

The exemplary embodiments may enable law enforcers to prevent the shootings before any lives are lost. In one embodiment, a firearm tracking system is configured to notify the law enforcement agencies in real-time at the very moment a registered firearm is transported away from this firearm owner's home or from a declared storage location. In one embodiment, the firearm tracking system may detect that the firearm enters or approaches the vicinity of an area under court restraining order. Thus, the system is able to intercede and prevent the firearm from reaching a destination that can potentially be a site of a shooting or even a mass shooting. The system according to the exemplary embodiments is not intended to take away peoples' guns, but on only to track the firearms when the firearms are outside of owner's home or the firearm storage is tampered with. Then, the law enforcement personnel can physically intervene and prevent unlawful use of the firearms.

According to the exemplary embodiments, the firearm tracking system can use GPS tracking module enclosed in housing (i.e., Military Grid Reference System Tracking—MGRST) which is configured to fit inside a specifically designed cavity inside the firearm's body and/or a special housing modification. In one embodiment, the GPS tracking module may be placed adjacent or securely hanging to the body of the firearm. The MGRST module transmits/receives two-way communications to and from the Digital Cellular Network (DCN) using 4G-LTE, 4G, 5G or any wireless data transmission (WDT) means preferably under the Internet of Things (IoT) frameworks. In one embodiment, the tracking data may be sent from the DCN to the Network Operations Center (NOC) server using the Internet or other suitable means. The MGRST data received by the NOC server is processed for data identifying, classifying, storage and further processing pertaining to information about the firearm's unique ID Code as well as this firearm's current GPS physical location coordinates (GPS Coordinates). The tracking system may compute the distance between the current firearm location and the GPS Coordinates of this firearm owner's home, and/or this firearm's designated storage place from NOC database. The NOC may determine that the firearm is in "outside of home" status when a distance away from the designated GPS epicenter of a particular street address of the home or the storage place of the firearm exceeds a designated distance (e.g., 100, 200, 300 feet, etc.) depending on a classification radius from the NOC's designated GPS epicenter for a particular street address. For example, if the firearm owner lives in an apartment complex, this distance may be set to be much shorter than if the owner lives in a 20-acre farm. In this example, it would be a false alarm for the system to call authorities when the owner is just target practicing 500 feet away from his house in such a huge farm where the nearest street is at least 5,000 feet away. However, in the case of the apartments, the populated street may just be less than 200 feet away.

If the firearm is assigned an "outside of home" status based on the NOC's calculation, the NOC will send a signal over the Internet to the DCN, using the WDT to this firearm's MGRST, instructing it to send its GPS Coordinates at a pre-set faster interval (e.g., every ½ second or so). When the firearm is determined to be in "outside of home" status, the NOC (using the Internet and/or WDT means) informs the respective local law enforcement authority about the "outside of home" status of the firearm including its whereabouts and other relevant information regarding this firearm as well as its moving GPS coordinates in real-time as transmitted from the MGRST module for preventing possible shooting.

Live simulation using the inter-linked GPS Map and or other applications can be used to view the movement of the target firearm even inside a vehicle driven at high speed and may be provided to the low enforcement or event to the officers in pursuit. FIG. 1 illustrates an infrastructure that may be employed using the GPS Tracking System official website which depicts one typical wireless data transmission means (WDT) used for vehicle tracking, which can easily be converted to firearm tracking of the present invention. Additionally, the firearm may be tracked inside the moving vehicle.

Figure 2:
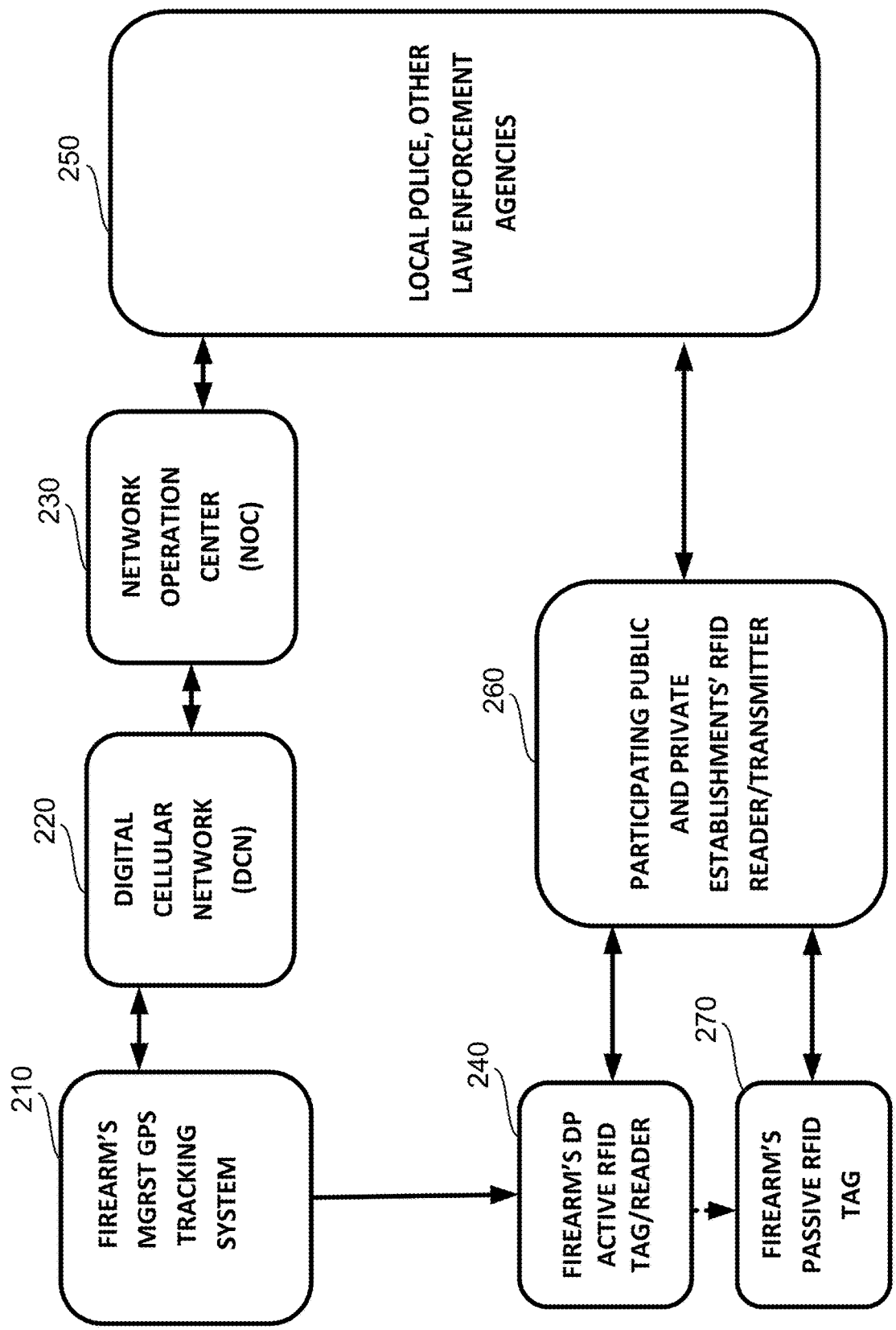
FIG. 2 is a flow chart of a transmission routing and a transactional protocol, according to exemplary embodiments.

FIG. 2 is a flow chart of a transmission routing and a transactional protocol, according to exemplary embodiments.

If a firearm is determined by NOC at block 230 to be "outside of home" and is heading toward or inside an area covered by a court restraining order, and if the NOC was informed about this court restraining order, this will trigger the NOC to place this firearm or any firearm in "extreme alert" status, which will immediately be relayed by the NOC to law enforcement agencies at block 250 about this "extreme alert" status for urgent and immediate action.

In contrast, if the NOC determines that this firearm is in "resting" status (no motion is sensed by the firearm's onboard motion sensor) and in "inside of home" status, the MGRST system at block 210 will be instructed by the NOC at block 230 to send its Identifier Code including its GPS coordinates only once a day to conserve battery since this firearm is "inside of home" as described in more details below with regard to FIGS. 3-6. In one embodiment, the NOC at block 230 may send a signal over the Internet to the DCN at block 220, using WDT to MGRST system at block 210.

In any event that the NOC at block 230 makes a determination that a firearm is in any of the following status: "outside of home", "tampered with", "low battery—less than 35%", "low battery—less than 10%", "RFID Tags have been tampered with", "the shrunk-wrap warning label has been tampered with", "MGRST is tampered with" status the firearm owner/representative will be contacted by every possible means by the NOC through SMS text or other texting means, e-mail, telephone call, at home visit by law enforcement personnel, etc. to give a warning of such status of their firearm and to provide directives as to what can be done to remedy the status if any, and/or may inspect the subject firearm to verify the accuracy of the status, or cite the owner/representative or for further action.

Figure 9:
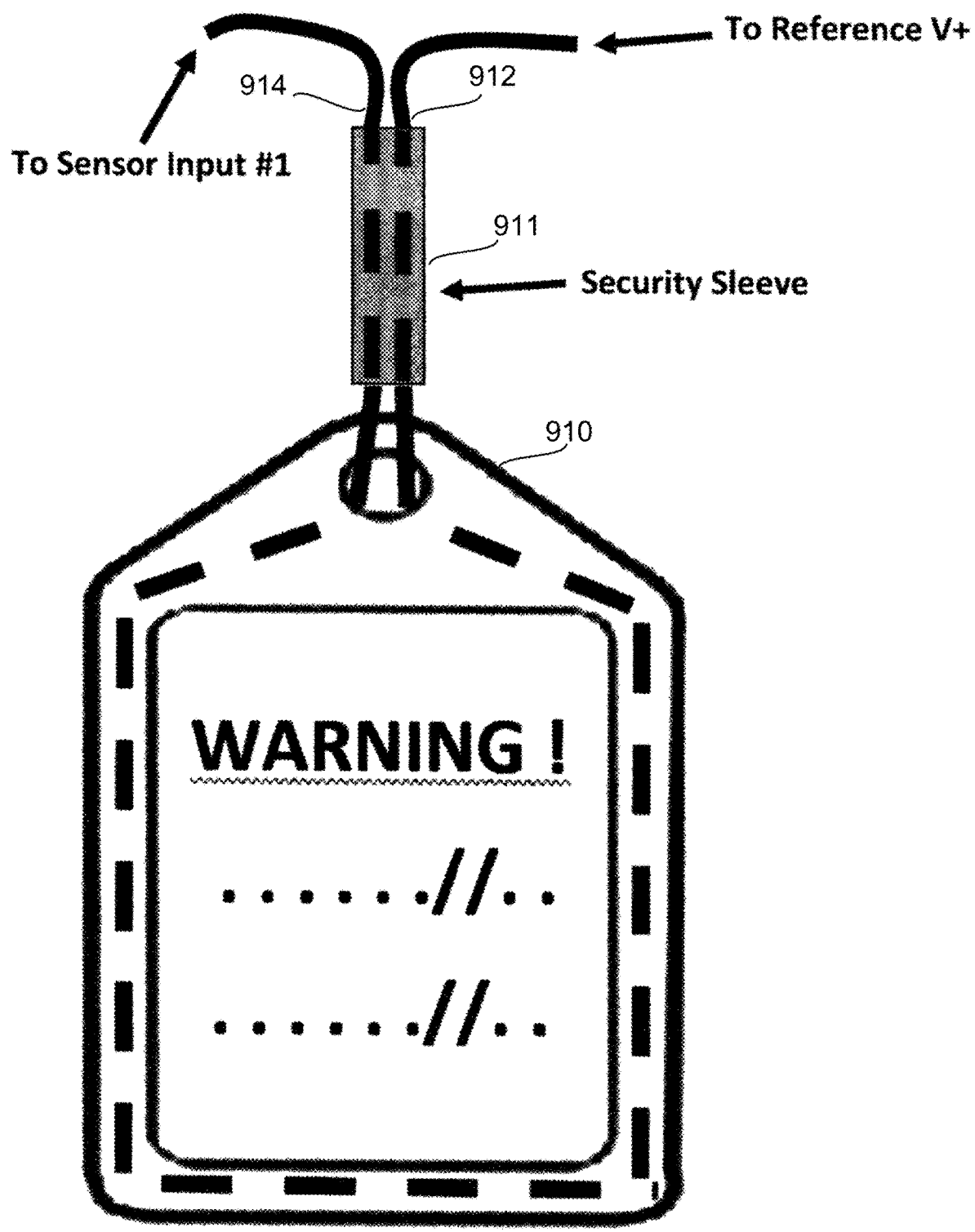
FIG. 9 illustrates a hanging warning label with a passive RFID Tag and a tamper sensor, according to the exemplary embodiments.
Figure 11:
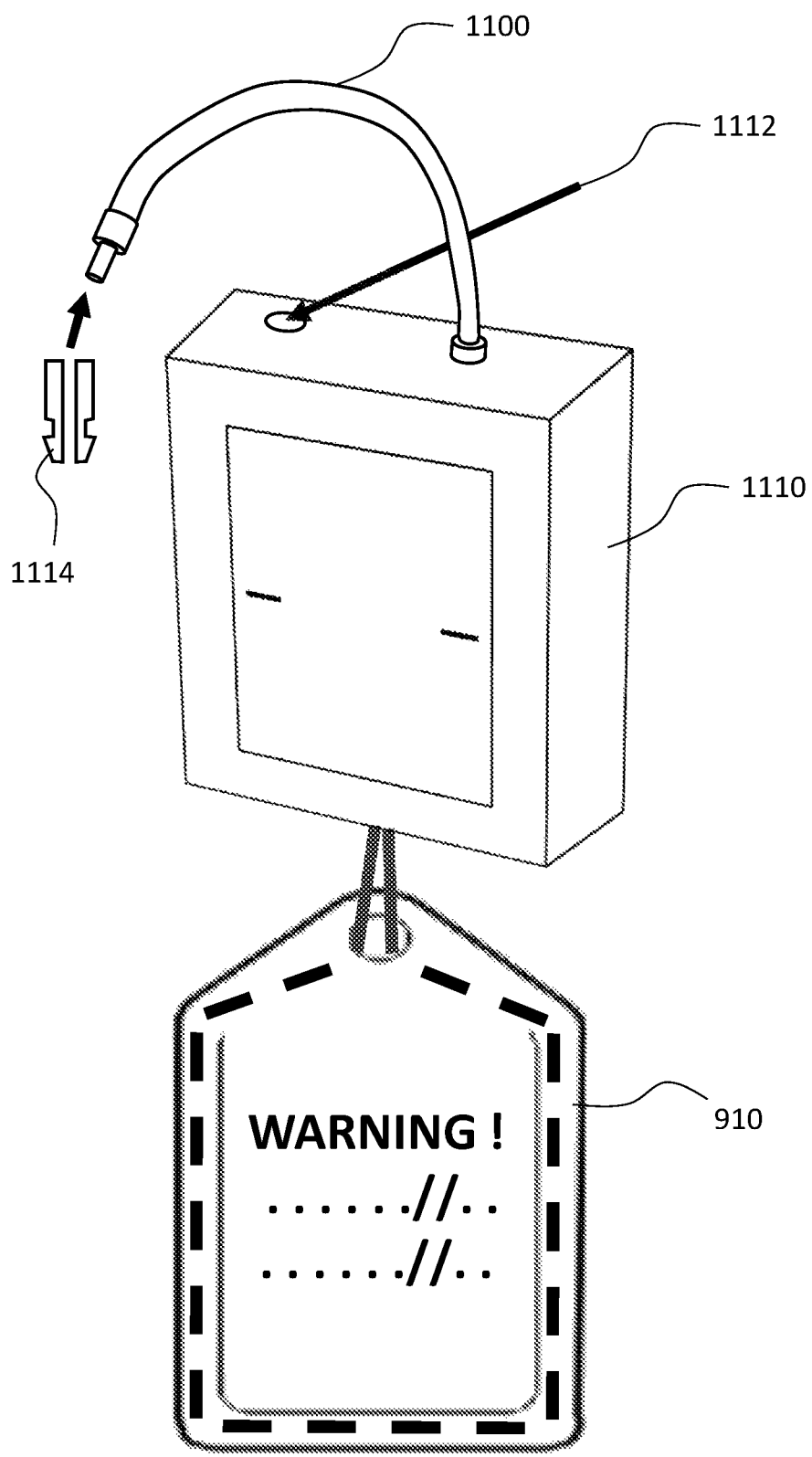
FIG. 11 illustrates an assembly of the exemplary MGRST housing without installed heat-shrunk warning cover wrap, according to one exemplary embodiment.

In addition to GPS tracking, each firearm's MGRST system at block 210 also incorporates at least one Dual Purpose Active RFID Tag (DP Active RFID) at block 240 and at least one Passive RFID Tag at block 270. One of the Passive RFID Tags may be installed on the hanging warning label as shown in FIGS. 9 and 11. The signals from the RFID Tags at blocks 240 and 270 are processed by the RFID reader/transmitter located within an RF range at block 260 which is configure to relay the information to local law enforcement entities at block 250.

Figure 3:
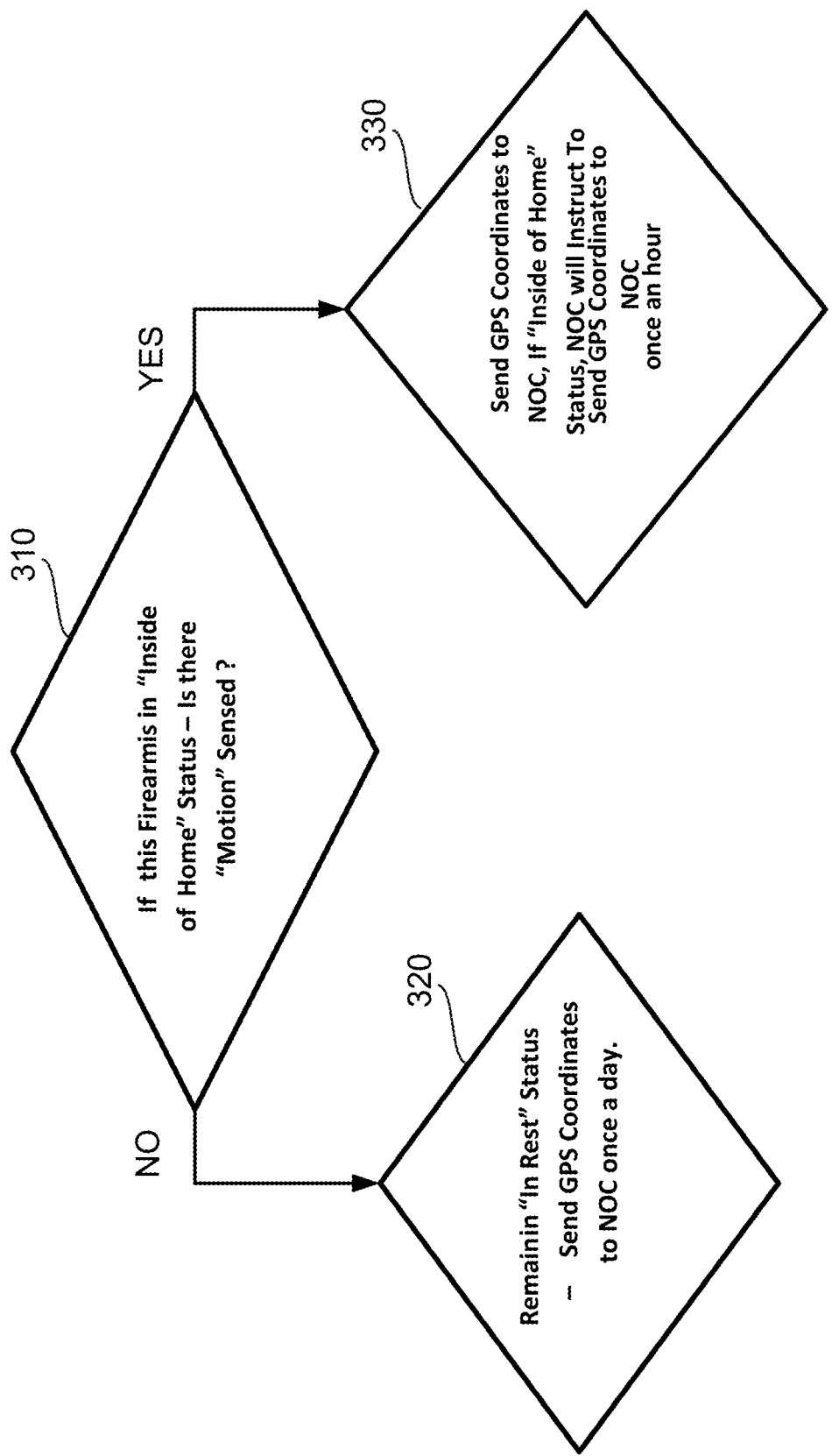
FIG. 3 illustrates a flow chart for "inside of home" status scenario, according to the exemplary embodiments.

FIG. 3 illustrates a flow chart for "inside of home" status scenario, according to the exemplary embodiments. At block 310 it is determined that the firearm is inside of home. If a motion is detected, at block 320 the GPS coordinates are sent to the NOC which will instructs the MGRST system to send the GPS coordinates once an hour (or shorter pre-set time period). Otherwise, if no motion is senses at block 310, the "rest" status is assigned and the NOC instructs the MGRST system to send the GPS coordinates once a day.

Figure 4:
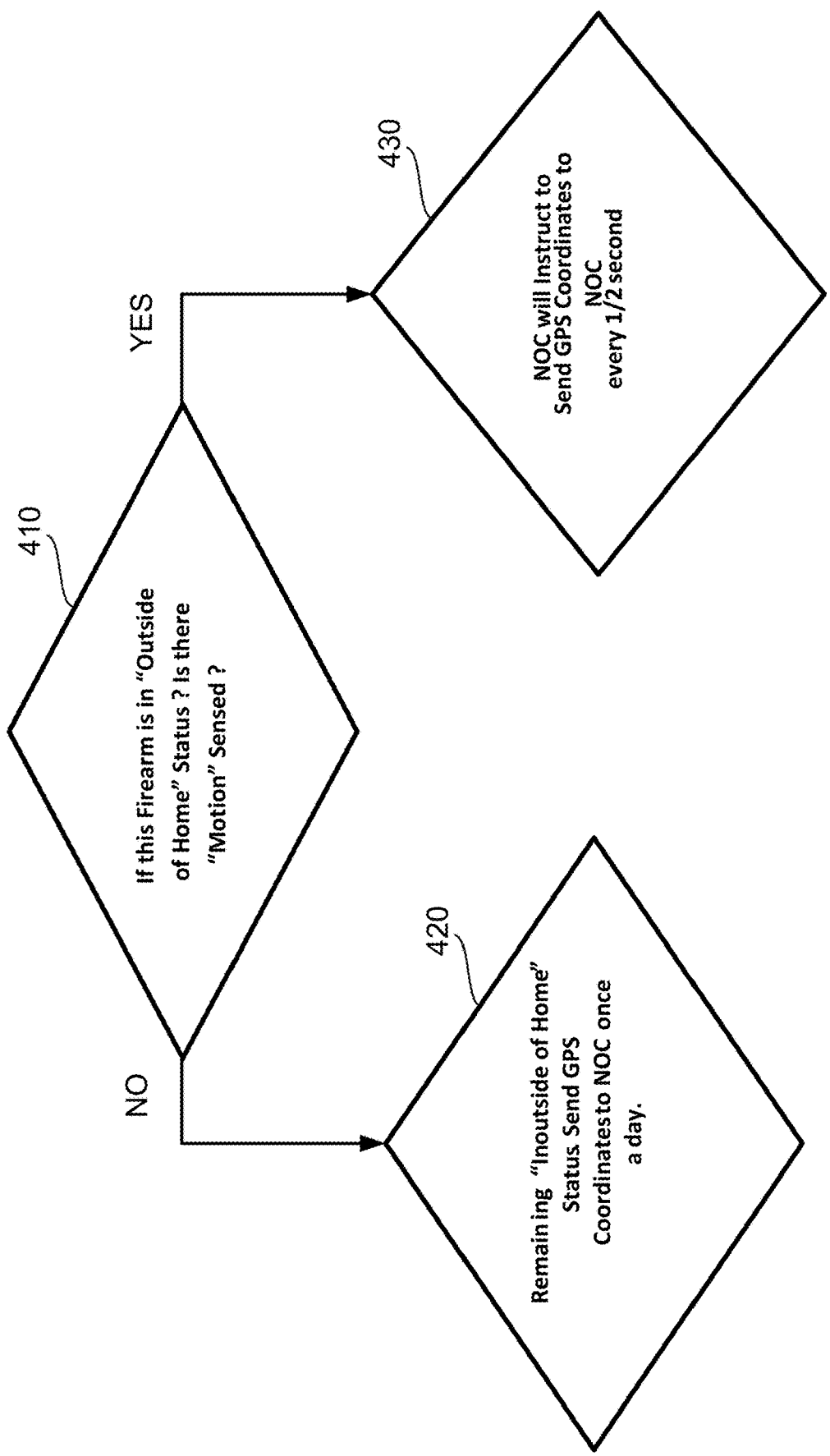
FIG. 4 illustrates a flow chart for "outside of home" status scenario, according to the exemplary embodiments.

FIG. 4 illustrates a flow chart for "outside of home" status scenario, according to the exemplary embodiments. At block 410 it is determined that the firearm is not outside of the home, at block 420 the GPS coordinates are sent to the NOC which will instructs the MGRST system to send the GPS coordinates once a day (or shorter pre-set time period). Otherwise, if the firearm is outside the home and motion is senses at block 410, the NOC instructs the MGRST system to send the GPS coordinates every ½ seconds.

Figure 5:
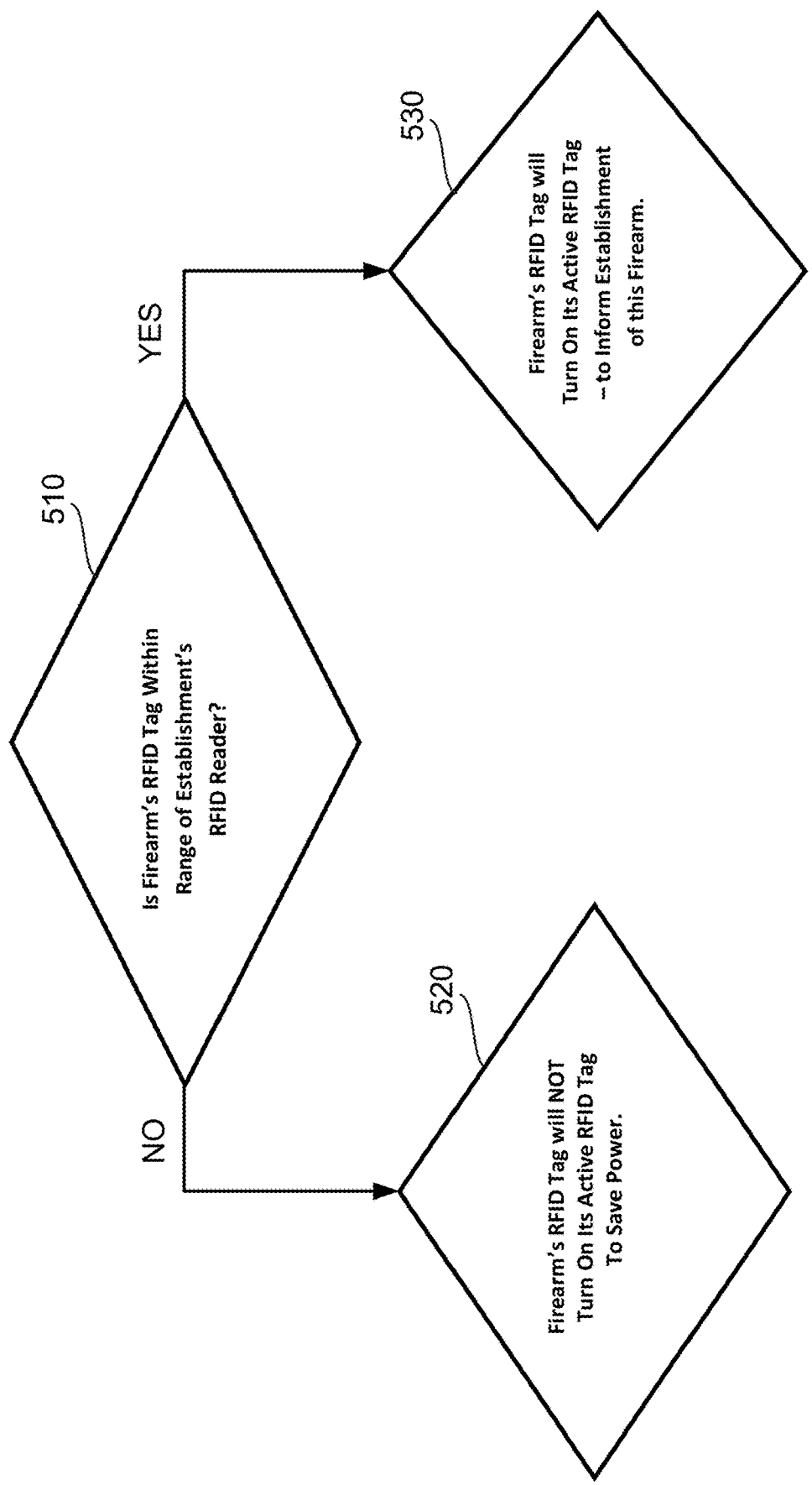
FIG. 5 illustrates a flow chart for "RFID Tag is within a range" status scenario, according to the exemplary embodiments.

FIG. 5 illustrates a flow chart for "RFID Tag is within a range" status scenario, according to the exemplary embodiments. At block 510 it is determined that the firearm RFID Tag is in a range of the establishment's RFID Tag reader. Then, at block 530, the RFID Tag of the firearm turns on the RFID Active Tag to inform the establishment. Otherwise, at block 520, the RFID active Tag remains off.

Figure 6:
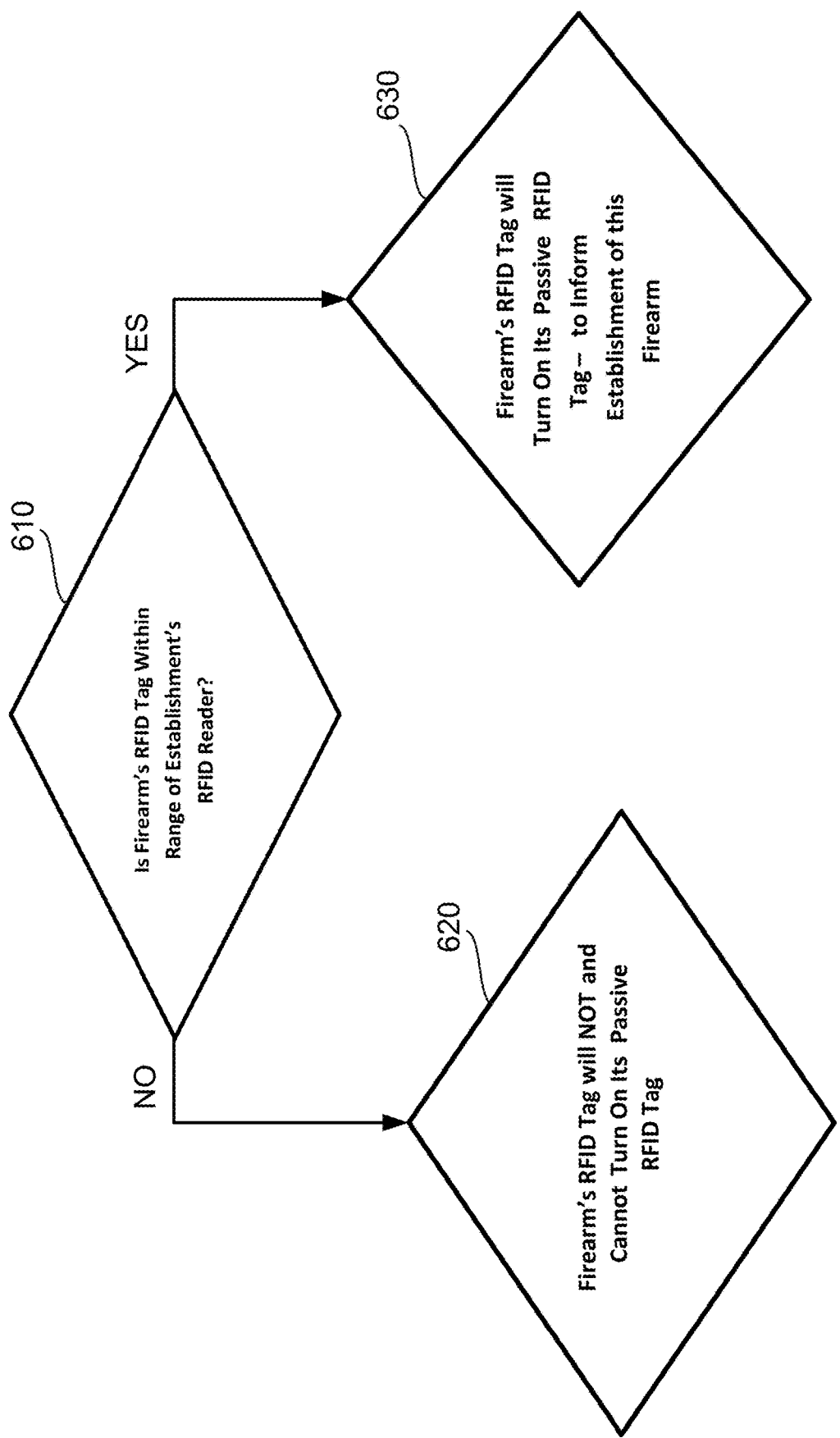
FIG. 6 illustrates a flow chart for "RFID Tag is within a range of the establishment's RFID reader" status scenario, according to the exemplary embodiments.

FIG. 6 illustrates a flow chart for "RFID Tag is within a range of the establishment's RFID reader" status scenario, according to the exemplary embodiments. If, at block 610, it is determined that RFID Tag of the firearm is within a range of the establishment's RFID reader, at block 630, the firearm RFID Tag turns on its passive RFID Tag to inform the establishment. Otherwise, at block 620, the passive RFID Tag remains off and cannot be turned on.

Figure 7:
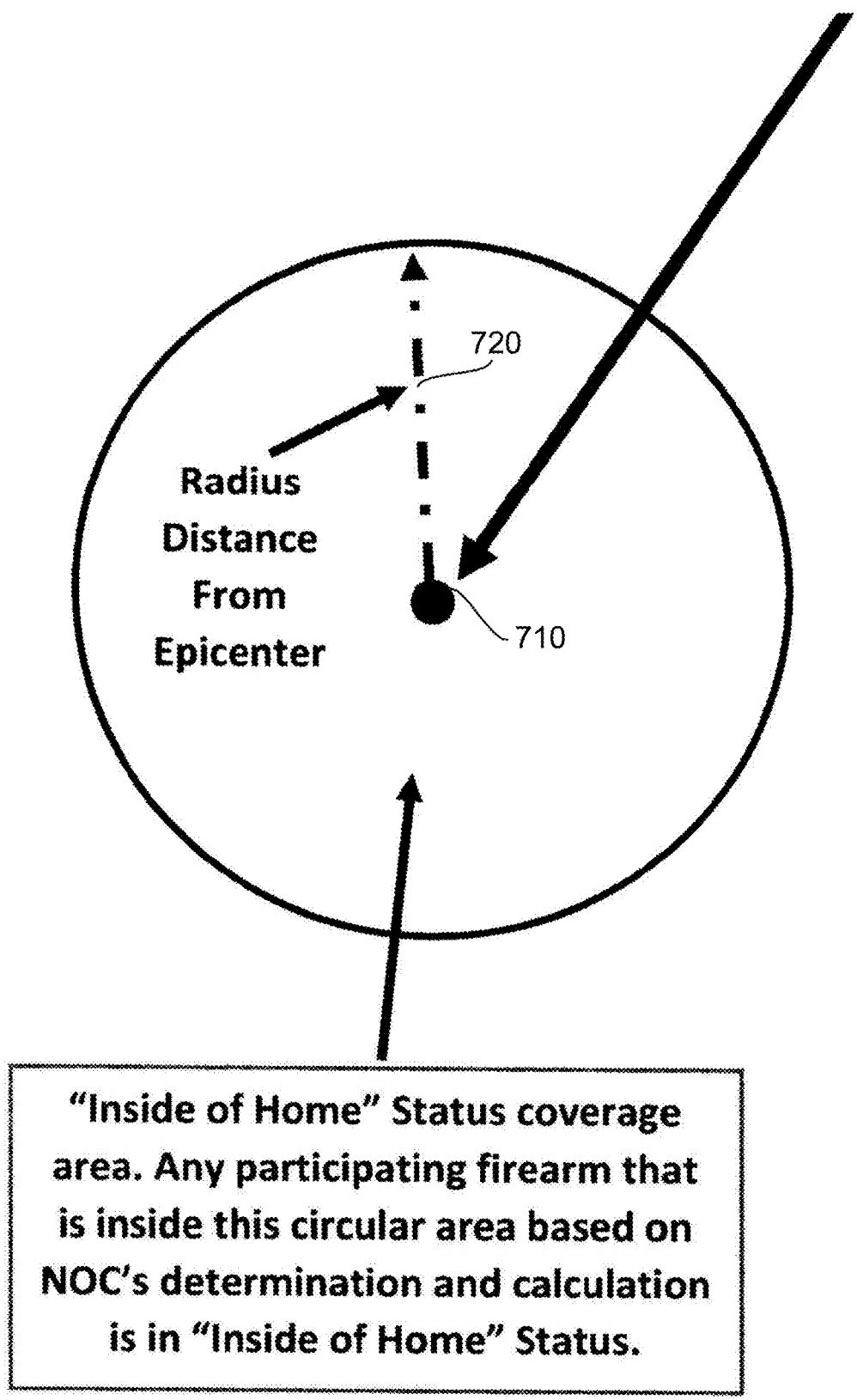
FIG. 7 illustrates how the "inside of home" status is determined, according to the exemplary embodiments.

FIG. 7 illustrates how the "inside of home" status is determined, according to the exemplary embodiments.

As discussed above, the NOC may determine that the firearm is in "outside of home" status when a distance/radius 720 away from the designated GPS epicenter 710 of a particular street address of the home or the designated storage place of the firearm exceeds a designated distance (e.g., 100, 200, 300 feet, etc.) depending on a classification radius from the NOC's designated GPS epicenter 710 for a particular street address. For example, if the firearm owner lives in an apartment complex, this distance may be set to be much shorter than if the owner lives in a 20-acre farm. In this example, it would be a false alarm for the system to call authorities when the owner is just target practicing 500 feet away from his house in such a huge farm where the nearest street is at least 5,000 feet away. However, in the case of the apartments, the populated street may just be less than 200 feet away. If the coordinates of the firearm are inside the circled area, the firearm is assigned an "inside of home" status by the NOC. If the coordinates of the firearm are outside of the circled area, the firearm is assigned an "outside of home status". The same calculations may be applied to the situation where the distance to the restraining point or area is used. In this case a status "inside of the restrained area" is critical, and the NOC will notify the law enforcement entity. The status "outside of the restrained area" is treated in the same manner as the "inside of home" status.

Figure 8:
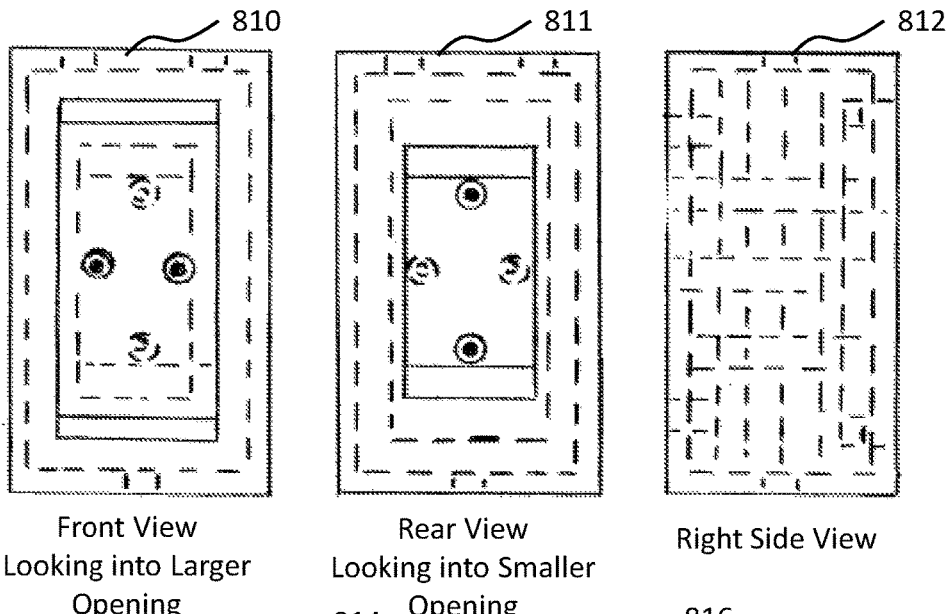
FIG. 8 illustrates different views of the housing of the MGRST GPS Tracking/active DP RFID Tag and batteries, according to the exemplary embodiments.
Figure 8:
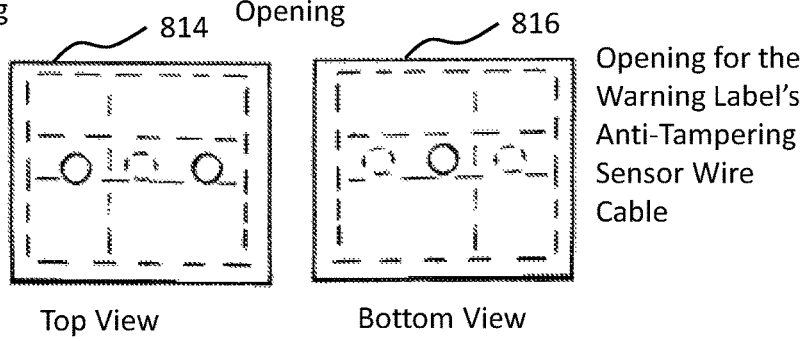
Figure 8:
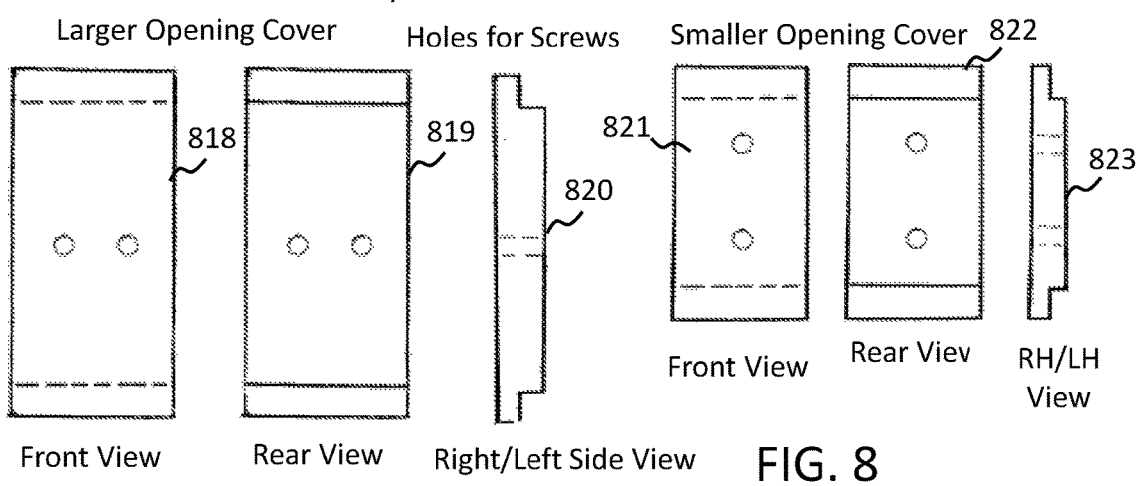

FIG. 8 illustrates different views of the housing of the MGRST GPS Tracking/active DP RFID Tag and batteries, according to the exemplary embodiments. Element 810 represent a front view, 811 illustrates a rear view, 812 illustrates a right-side view. Elements 814 and 816 represent respective top and bottom views. Elements 818 and 819 represent respective front and rear view of the large housing cover. Elements 818 and 819 represent respective front and rear view of the large housing cover. Element 820 is a side view of the large opening cover. Elements 821 and 822 represent respective front and rear view of the smaller opening cover. Element 823 is a side view of the smaller opening cover.

FIG. 9 illustrates a hanging warning label with a passive RFID Tag and a tamper sensor, according to the exemplary embodiments. As can be seen from the FIG. 9, the hanging warning label 910 may be configured to be attached to the firearm. The passive RFID Tag may be sandwiched in between the two label Tag sheets that form the hanging warning label 910. The sensor wire 914 serves as tamper detection as well as attachment means for the label Tag. If the sensor wire 914 is cut or tampered with, the sensor input #1 may be transmitted to the NOC. The second end of the wire labeled 912 is goes to a reference voltage source that is used for tamper detection. The sensor wire 914/912 may be protected by a security sleeve 911.

Figure 10:
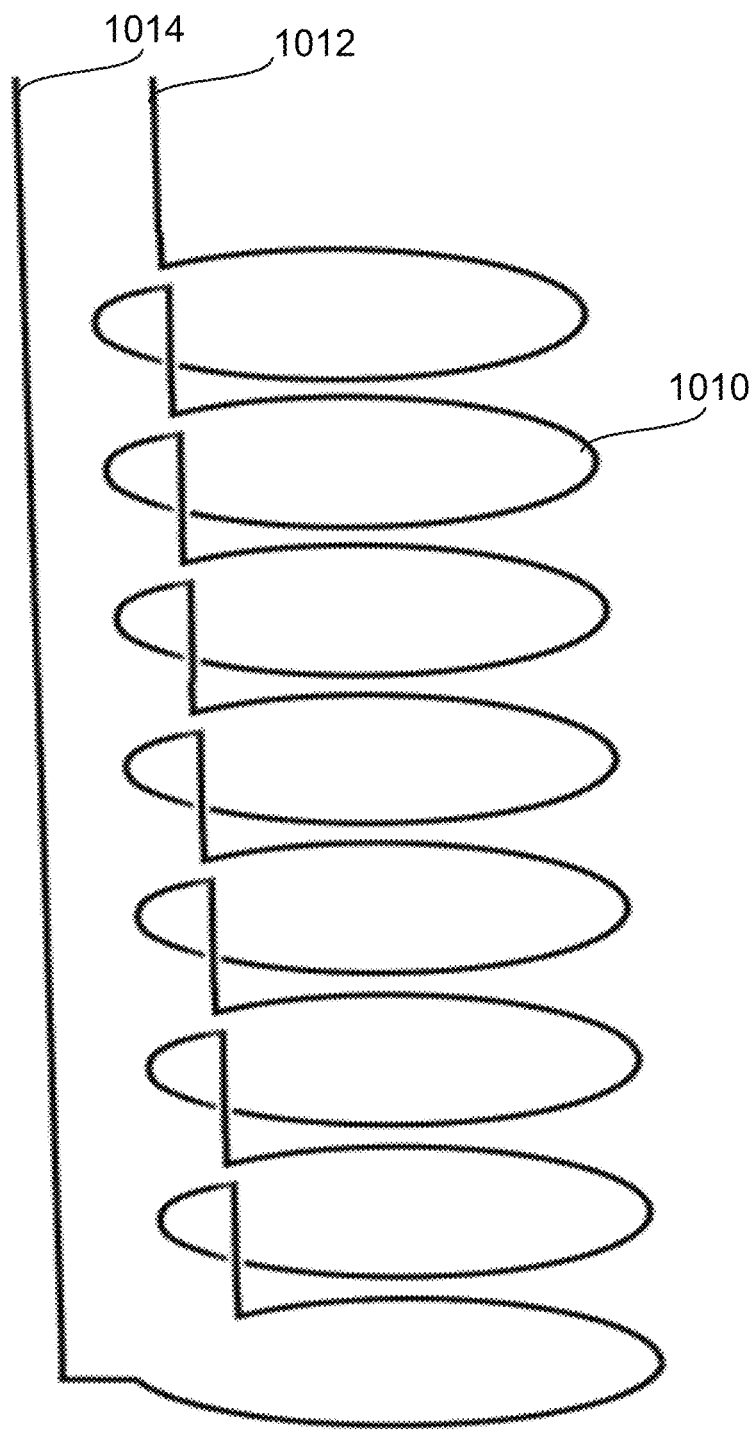
FIG. 10 illustrates a basic setup of a tamper sensor of the warning label cover, according to the exemplary embodiments.

FIG. 10 illustrates a basic setup of a tamper sensor of the warning label cover, according to the exemplary embodiments. The tamper sensor employs an insulated very thin wire 1010 formed into an evenly spaced circular coil of a closed electrical loop. The wire 1010 may attached or laminated to the inside wall of a heat-shrunk wrap sleeve (not shown) that covers the wire 1010. Since the wire 1010 is integrated into the inside wall of the heat-shrunk wrap sleeve material, it makes it extremely hard to gain access to the mount screws of the MGRST housing without cutting or tampering with the closed loop wire 1010 which in turn may cut the reference voltage 1012 supply to sensor input pin 1014 resulting in "tamper sensor #2" status being reported to the NOC. As shown in FIG. 9, the tamper sensing heat-shrunk wrap sleeve 910 is made of heat-shrinking opaque that has a warning printed on its front surface.

FIG. 11 illustrates an assembly of the exemplary MGRST housing without installed heat-shrunk warning cover wrap, according to one exemplary embodiment. Note that the heat-shrunk warning cover wrap may be installed at the factory.

Figure 12:
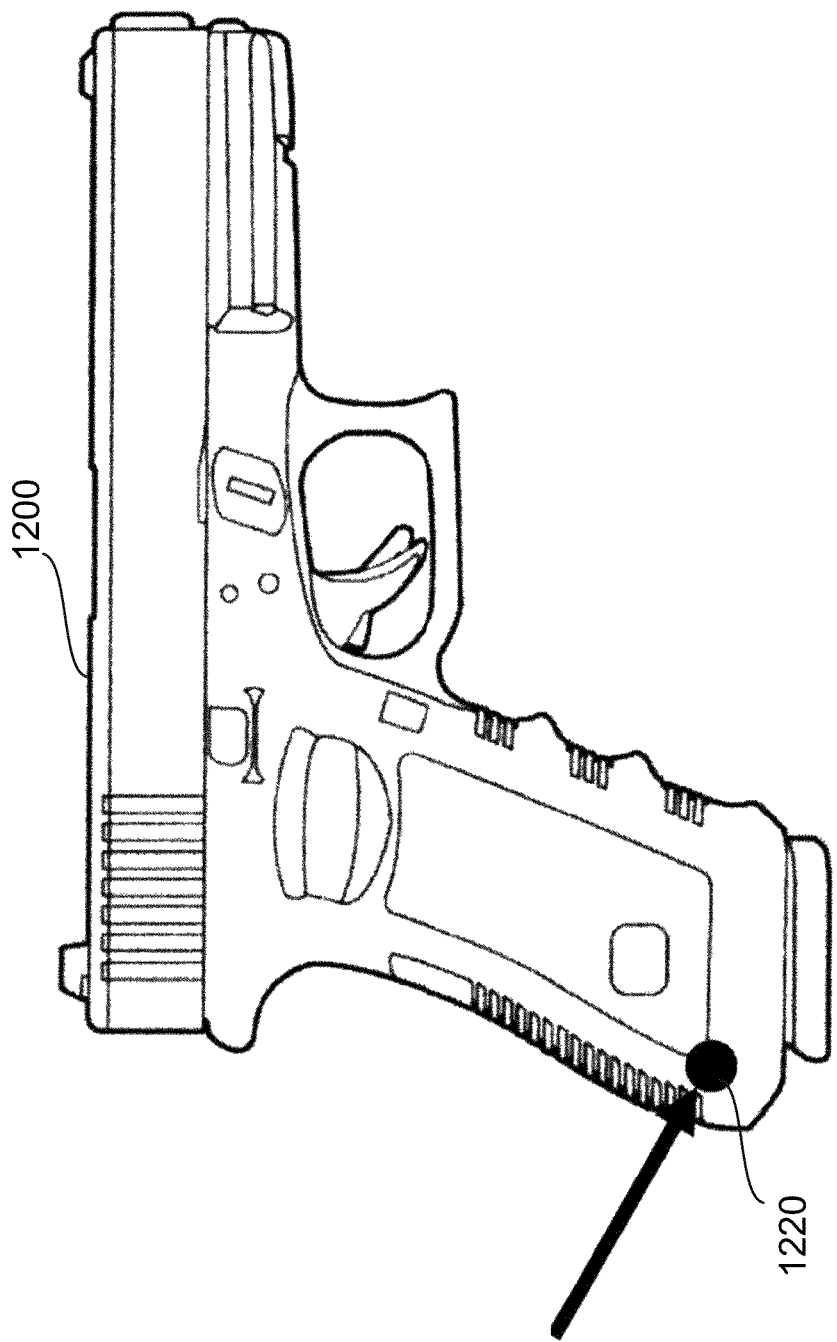
FIGS. 12-13 illustrate examples of firearm bodies with holes/openings for secure attachment of the MGRST housing, according to example embodiments.
Figure 13:
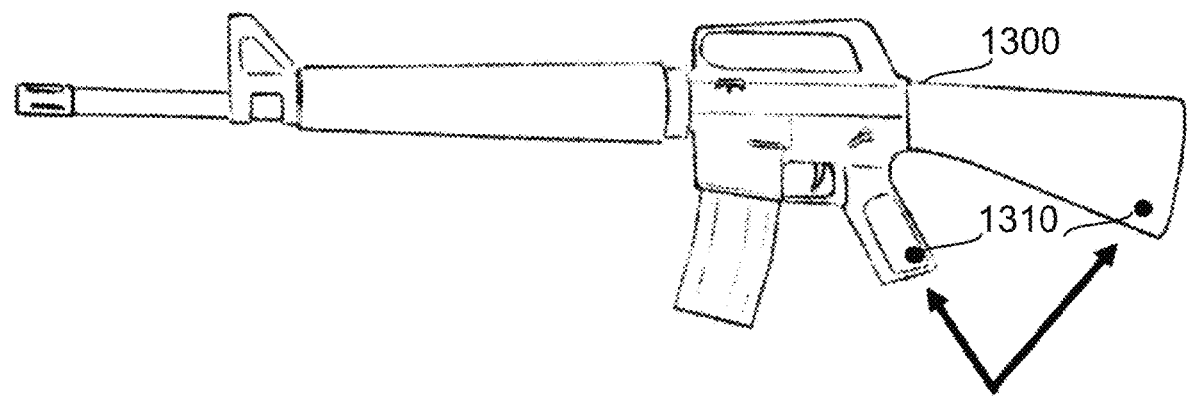
Figure 13:
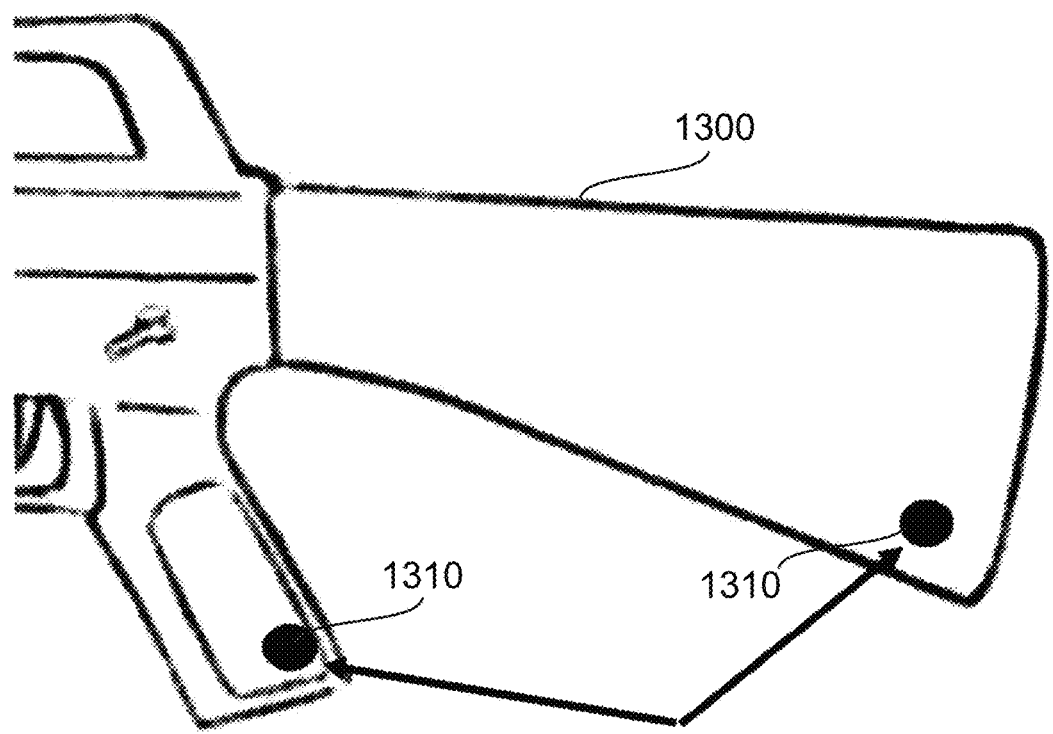

The MGRST housing 1110 has a hole 1112 for inserting the flexible cable 1100 after it is inserted into a special opening in the body of the firearm 1200 or 1300 as shown in FIGS. 12 and 13 (see respective holes/openings 1220, 1310) to securely attach the MGRST housing 1110 to the firearm. Once the cable 1100 is inserted, it is locked by a locking nut 1114. In this example the MGRST housing 1110 does not have an installed integrated heat-shrunk warning label attached (shrink-wrapped to the housing). Instead, a hanging warning label 910 is used.

The hanging warning label as well as the heat-shrink wrap warning cover label of the DP Active RFID has warning signs printed on its surfaces, which in essence would stress the warning points to visually warn the person carrying the firearm that this firearm is being tracked by law enforcement authorities and taking this firearm away from its home base location could result in questioning and possibly arrest, and that any tampering is prohibited, unlawful and is subject to legal prosecution. The warning label may as well have a visible background color to attract attention to the warning label. The hanging warning label may 910 may incorporate a passive RFID Tag which does not require any power to transmit signals to the nearby located RFID readers of private and public establishments.

Figure 14:
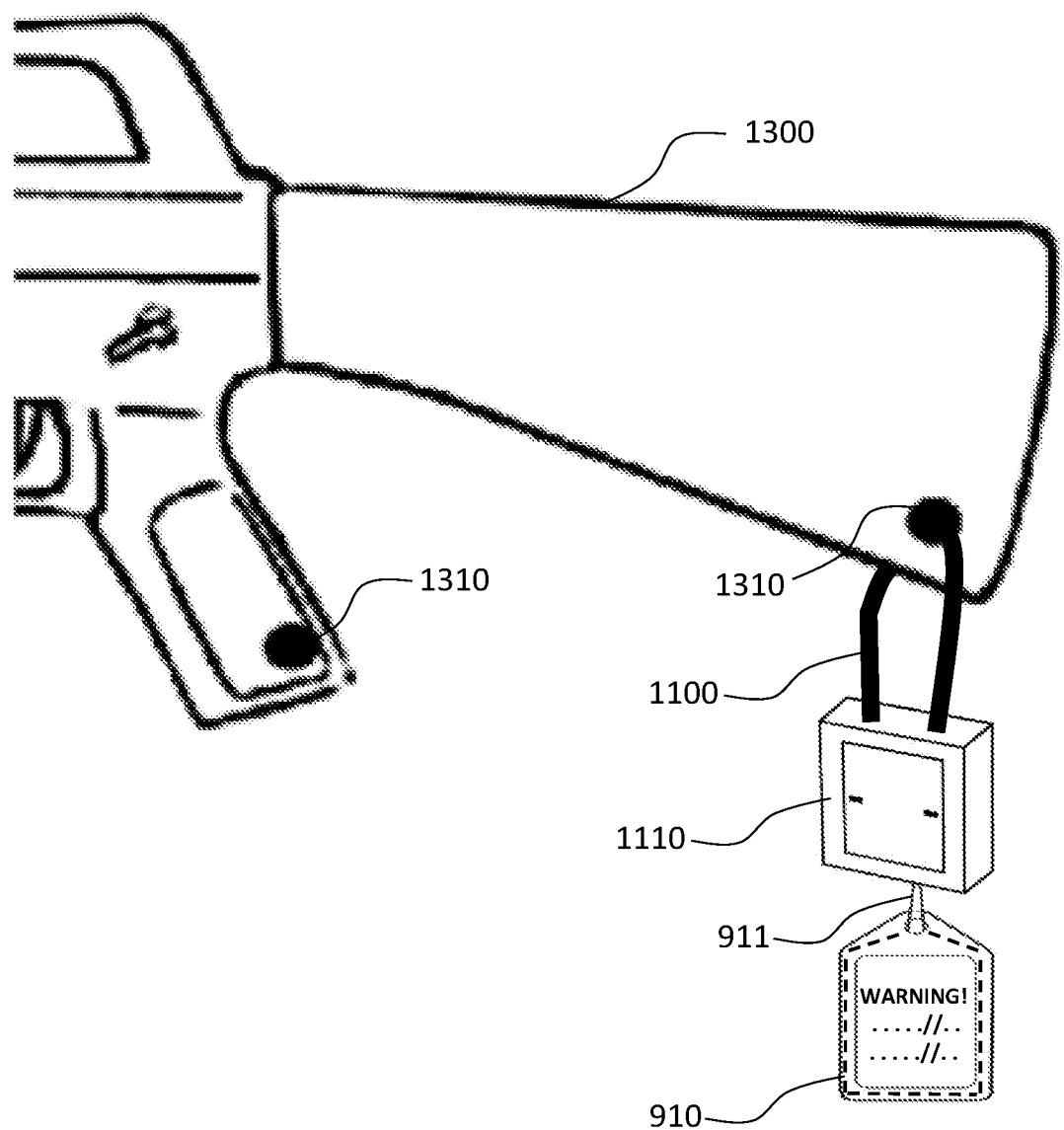
FIG. 14 illustrates a typical installation of the MGRST housing to non-detachable parts of a rifle, according to example embodiments.

FIG. 14 illustrates a typical installation of the MGRST housing to non-detachable parts of a rifle, according to example embodiments.

As discussed above with reference to FIG. 11, the MGRST housing 1110 may be attached to the body 1300 of the firearm by a cable 1100 that is inserted through the hole(s) 1310. The warning label 910 may be attached to the MGRST housing 1110 by a wire integrated inside the security sleeve 911.

In one embodiment, the DP Active RFID may be installed on the covered surface cavity at the side of the firearm's body, and/or a special housing modification in, adjacent or securely hanging to this body as illustrated in FIG. 14. A sturdy opaque heat-shrunk warning label cover wrap 910 is designed to physically act as an outside cover to the covered DP Active RFID inside of the cover wrap 910 or other cavity inside the firearm's body and/or a special housing modification in, adjacent or securely hanging to this body as shown in FIG. 14. This heat-shrunk warning label cover wrap 910, when fully installed and shrunk-wrapped, may provide a tight and tamper resistant/traceable seal to the DP Active RFID inside this cavity as well as the MGRST in the inside cavity. The heat-shrunk warning label cover wrap 910 serves to cover any access to the cover mount screws to discourage and deter tampering.

The DP Active RFID has a longer range than the Passive RFID, which uses the $2^{nd}$ battery for power (see FIG. 8), and to further conserve power, it uses a diode for a one-way flow of positive charging voltage from the $1^{st}$ battery into the $2^{nd}$ battery, but prevents the $2^{nd}$ battery power from escaping back into the $1^{st}$ battery (diode's one-way electrical flow in a DC circuit). This ensures that even if the $1^{st}$ battery is drained, the $2^{nd}$ battery if still charged and will not be drained by MGRST's consumption because the MGRST is powered by the $1^{st}$ Battery, as shown in FIG. 8.

The DP Active RFID remains de-activated and does not transmit signals until the MGRST's RFID reader receives the right unique ID Code message from the establishments' Active RFID Transmitters/Readers located in the vicinity (e.g., entrance or parking spaces of participating establishments). In short, to conserve power, the MGRST's DP Active RFID stays inactive until it is in range to receive the right unique ID Code from the establishments' Active RFID Transmitter/Reader. Upon receiving the establisment's RFID unique ID Code, the MGRST's RFID Reader first compares the ID Code to a stored target code. Only if there is a match, the MGRST's DP Active RFID Tag is activated, which will then transmit the firearm's ID Code to the establishment's RFID reader.

Upon comparing and matching the received firearm's ID Code to its stored target codes in its database, the establishment's RFID Reader may immediately activate the alarm and other warning devices alerting all personnel and authorities about the presence of this firearm.

These firearms' RFID tags transmit identical unique firearm's ID Code that is unique to this firearm to the establishment's RFID Reader/s located at the entrance/vicinity areas of participating public and private establishments as last-minute warning of the presence of this firearm as a back-up of the GPS Tracking. The unique firearm's ID Code, if accessed on the NOC's database reveals the name of the owner, address of residence, address of the declared firearm's place of storage if different from the residence address, and possibly the name and address of employer, the firearm's brand, model, serial number, date and place where purchased, owner's cell phone, home phone, work phone, email and/or personal references, other important information and any security concerns with the gun owner or the firearm.

As discussed above, the Warning Label Tag's anti-tampering sensor preferred embodiment is shown in FIG. 9. If the wire loop used to hang the Warning Label Tag to the firearm's body is cut off or severed, it will result in the loss of the reference V+ voltage to sensor input #1 in the MGRST as illustrated in FIG. 10 and the absence of this reference V+ voltage to this input sensor #1 is interpreted in the MGRST CPU as tampering and will result in the MGRST transmitting a signal code for "Tampered #1" to the NOC through the DCN, resulting in the NOC transmitting a signal to the MGRST through the DCN to begin transmitting its GPS location to the NOC through the DCN every ½ second or so as designated.

As discussed above with regards to FIG. 10, the anti-tampering sensor is comprised of a very thin, very pliable and hardly visible insulated wire that is attached/laminated to the inside wall of the heat-shrunk wrap warning cover label sleeve of the DP Active RFID. This thin wire is wrapped numerous turns and strategically attached and evenly spaced apart in the form of a coiled loop along the inside perimeter wall of the heat-shrunk wrap warning cover label forming a single wire close electrical loop as shown in FIG. 10.

This closed electrical loop thin wire is used to supply reference V+ voltage to sensor input #2 in the MGRST as illustrated in FIG. 10, whereby, the reference V+ voltage supply to sensor pin #2 passes through this closed electrical loop thin wire that if this wire is cut or severed as in tampering will create an "opening" in the formerly closed electrical loop.

During the heat-shrinking procedure used for assembly of the MGRST at a factory, this wire being very thin and pliable, will not offer any resistance when this warning cover label shrink wrap sleeve is being heat-shrunk to tightly form the shape of the corresponding firearm's body and/or a special housing modification in, adjacent or securely hanging to this body. This closed electrical wire loop and physical orientation of this thin and very pliable insulated wire is such that it would be extremely hard, if not impossible, to cut open this heat-shrunk wrap warning cover label in order to gain access and tamper with the DP Active RFID and the MGRST without cutting this single wire closed electrical loop in the heat-shrunk wrap warning cover label sleeve.

If this thin wire is cut or severed, it will cause the absence of reference V+ voltage in sensor input #2, and the absence of this reference V+ voltage in this sensor input pin #2. This is interpreted in the MGRST CPU as tampering and will result in the MGRST transmitting a signal code for "Tampered #2" to the NOC through the DCN, resulting in the NOC to transmit a signal to the MGRST through the DCN to begin transmitting its GPS location to the NOC through the DCN every ½ second or so as designated.

The MGRST assembly also incorporates a built-in motion sensor which activates the MGRST from its "Inside of Home" location status into "In Motion" status, which triggers the MGRST to transmit this "In Motion" status to the NOC through the DCN, whereby the NOC will transmit a signal back to the MGRST through the DCN instructing the MGRST to transmit its GPS location back to the NOC, if NOC determines that the MGRST's GPS location remains in "Inside of Home" status, then the NOC will transmit a signal to the MGRST to remain its "Inside of Home" status mode and transmit every hour if no further motion is detected, and repeat this cycle for every subsequent sensed motion.

However, if the NOC determined that the MGRST is in "Outside of Home" Status, then it will transmit a signal back to the MGRST to proceed under "Outside of Home" status protocol and transmit its GPS location coordinates back to NOC once every ½ second or so as designated, and this cycle repeats as long as the MGRST senses subsequent motions and if this MGRST's physical location stays in "Outside of Home" Status.

The MGRST assembly also incorporates a NO (normally open) magnetic reed switch, which serves as an initial activator of the MGRST during installation to the firearm. When this magnetic reed switch of the MGRST is exposed to a very strong magnet, even if the magnet is outside of the firearm housing or outside the special housing modification (i.e., adjacent or securely hanging to this firearm's body), the MGRST becomes "activated" and an electronic permanent latch in the MGRST circuit keeps the MGRST in "Active" mode permanently, and the MGRST retains this "Active" mode even after repeated battery charged/discharged cycle.

There is an "Active" mode green LED indicator light wired/connected to the MGRST and physically oriented to have this LED to be visible from the outside of the firearm's body.

According to the exemplary embodiments, the MGRST assembly also incorporates two long-life re-chargeable $1^{st}$ and $2^{nd}$ batteries, preferably lithium or the like, and an electrical charger port wired/connected to the MGRST and physically oriented to have this electrical charger port to be accessible from the outside of this firearm to allow outside access for charging the battery. A dual LED (Green/Red) battery charge indicator light is connected to battery charge indicator for the $1^{st}$ battery in the MGRST and physically oriented to have this dual LED to be visible from the outside of the firearm's body when installed. A green light indicates that $1^{st}$ battery is fully charged, while a red light indicates 35% or less charge state and indicates the need to recharge the system. The battery charge indicator light reflects only the $1^{st}$ battery and not the $2^{nd}$ battery.

The MGRST's battery charge sensor circuit, in addition to detecting $1^{st}$ battery's fully charged status, is further designed to detect a 35% and 10% $1^{st}$ battery charge. If 35% battery charge is detected, the MGRST will place this battery under "low battery—less than 35%" status. If 10% battery charge is detected, the MGRST will place this battery under "low battery—less than 10%". If either of these states is detected, the MGRST will activate the red side of the dual LED battery charge indicator light.

If under "low battery—less than 35%" status is detected, the MGRST will send a signal to the NOC through the DCN of such a status of this MGRST. However, if under "low battery—less than 10%" status is detected, the MGRST will send a signal to the NOC through the DCN of such a status, which will prompt corresponding actions by NOC discussed above.

The initial installation of the MGRST Tracking system to the firearm may be done by the firearm's manufacturer or its authorized representative, and duly licensed and trained to perform these services by the authorizing entity. This MGRST Tracking system comes fully assembled for installation to the firearm. As discussed above, for installing the securely hanging MGRST to the body version, the free end of the main attaching durable but flexible cable is inserted through the designated access hole on the firearm's body—preferably on the grip for both pistol and revolver handguns or the non-detachable stock portion for rifle. This end has a locking means to ensure that it stays installed once inserted to the corresponding hole in the MGRST's sturdy container as shown in FIG. 14.

During or even before this installation, this systems battery is charged again to ensure to full charge before shipment out to the owner. During this process, the MGRST is "activated" or placed in "active" status using a very strong magnet right next to or adjacent to the general location where the magnetic reed switch of the MGRST is located. Once activated, the green mini-LED light will visibly come on, and once activated, the MGRST will retain this "active" status even when the $1^{st}$ battery is discharged and recharged. During the installation, MGRST's "initializing" is performed whereby the MGRST's unique ID Code together with the corresponding firearm's details such as brand and type, manufacturer, serial number, date and place of installation, name of installer, name and address of installing facility, name and address of owner, address of where the firearm will be stored, shipping address, name of shipping company and expected delivery date to the NOC linked website.

Upon this NOC initialization process, the NOC will recognize this MGRST based on the information entered at the installing facility, and will save all these data in NOC's memory, and the NOC will communicate with this MGRST to transmit its GPS location to NOC. Once NOC determines that although this firearm is in "outside of home" status, but because this firearm is in the installing facility based on matching GPS location with the installer's designated radius of installer's GPS location epicenter, the NOC will transmit a signal to this MGRST with instruction to "extended time off" to last until the expected delivery day and/or when this firearm is received by the owner. This will save MGRST's battery life and prevent unnecessary false "outside of home" alert while in transit.

The participating establishment's RFID Active Tag/Readers is required to employ an identical transmission protocol and tracking applicable to the Active and Passive RFID Tags on the participating firearms as incorporated into the same system's firearm GPS tracking of the invention. The infrastructure depicted in FIG. 1 can be easily modified to accommodate firearms instead of vehicles, but in addition to just firearms GPS tracking to tracking of establishments' RFID Readers' tracking as well. The participating establishment's RFID Active Readers can be linked to the NOC using the same or identical method so as to make the entire system in a more coordinated effort of having just one main administrator (NOC) of all these data transmitted through the tracking system described herein.

In one exemplary implementation, only those firearms owned/and or in the possession of individuals subject to court imposed restraining order and/or those who have committed firearm felony offenses and/or those individuals who have made threats of committing firearm related criminal act against other individuals and/or establishments would be the group of firearms to be included to this firearm tracking system while those firearms owned and/or in possession of law abiding citizens may not be tracked under this system.

Some types of hand guns and hunting rifles may be exempt from the list of covered firearms temporarily, permanently and/or conditionally based on local legislations. This act to exempt may be subject further tailoring down to exclude those hand guns and/or hunting rifles which are owned by former convicted felons, or those gun owners that are under court issued restraining order and or having other mental, psychological, marital or other issues that may warrant this exclusion from this exemption.

In one exemplary implementation, an agreement with firearm manufacturers and/or their representatives may be reached to have the manufacturers to provide the best attachment point for the universal firearm tracking system described herein or to have manufacturers perform the installation of the universal firearm tracking system.

In one exemplary implementation, publicly available information about owners' addresses the unique GPS coordinate of each of the epicenters corresponding to these addresses may be acquired from databases. The system may prescribe outer limit of the "Inside of Home" status coverage area for the respective addresses and epicenters.

According to one embodiment, a Map Tracking App visual interface may be implemented to be deployed by the law enforcers' in-car computer or Smartphone which allows visual map simulation of the exact location of the tracked firearm visually appearing on a local map shown on a display. In one embodiment, it may be determined from the stored epicenters of the registered addresses that what owners have outstanding restraining orders and ensuring that the "Outside of Restrained Area" status is maintained.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications thereto.

What is claimed is:

1. A universal firearm tracking system, comprising:
a tracking module enclosed in a housing;
a cable attached to the housing configured to attach the housing to a firearm; and
a hanging tamper-proof warning label connected to a bottom of the housing by a wire.

2. The system of claim 1, further comprising a dual purpose active RFID Tag and at least one passive RFID Tag positioned inside the housing.

3. The system of claim 1, further comprising at least one passive RFID Tag integrated into the hanging tamper-proof warning label.

4. The system of claim 2, wherein signals from the dual purpose active RFID tag and the at least one passive RFID Tag are processed by an RFID tag reader or transmitter located in an RF range to determine a status of the firearm.

5. The system of claim 4, wherein, if the dual purpose active RFID tag is in a range of the RFID tag reader, the dual purpose active RFID Tag is turned on.

6. The system of claim 5, wherein the dual purpose active RFID tag is configured to transmit a unique firearm ID code to the RFID tag reader.

7. The system of claim 1, wherein:
the housing that encloses the tracking module comprises a heat-shrunk wrap cover sleeve and a motion sensor installed inside the housing; and
a hanging tamper-proof warning label comprises a heat-shrunk wrap cover sleeve.

8. The system of claim 7, further comprising an anti-tampering sensor comprising a thin insulated wire attached to or laminated to an inside wall of the heat-shrunk wrap cover sleeve.

9. The system of claim 8, wherein anti-tampering sensor comprises the thin wire wrapped as a plurality of evenly spaced apart loops in a form of a coiled loop positioned along an inside perimeter wall of the heat-shrunk wrap cover, wherein the coiled loop forms a single wire closed electrical loop.

10. The system of claim 8, wherein the anti-tampering sensor configured to receive a reference voltage supplied by the coiled loop, wherein cutting or breaking of the wire of the coiled loop results in lack of the reference voltage supply to an input pin of the anti-tampering sensor that generates an alarm signal.

11. The system of claim 1, wherein the wire is connected to a front cover of the housing attached by mounting screws for tamper-proofing of the tracking module.

12. The system of claim 1, wherein tracking module comprises GPS tracking comprising Military Grid Reference System Tracking (MGST) communicatively connected to a Network Operations Center (NOC) server.

13. The system of claim 12, wherein the NOC server is configured to determine a status of the firearm based on GPS coordinate received from the tracking module and pre-stored coordinates of a declared location base of the firearm.

14. The system of claim 13, wherein the NOC is configured to determine the status of the firearm using the epicenter coordinates and a radius from the epicenter.

15. The system of claim 12, wherein the NOC server is configured to communicate with a law enforcement control servers to enable the tracking of the firearm while being transported from a manufacturer.

16. The system of claim 12, wherein the NOC server is configured to provide data for visual representation or modeling of firearm movements via a mobile application.

17. The system of claim 12, wherein the NOC server is configured to determine if the firearm is located within a set radius of a restraining epicenter and to notify law enforcement control servers.

18. The system of claim 12, wherein the NOC server is configured to determine if the firearm is located outside of a set radius of an epicenter defined by pre-stored coordinates of a declared firearm location base and to notify law enforcement control server.

19. The system of claim 12, wherein the NOC server is configured to send a notification to firearm owner and to law enforcement control servers responsive to detection of tampering with the housing or detection of a law battery charge of the tracking system.

20. The system of claim 1, wherein the cable attached to the housing is configured to be threaded through a hole in a body of the firearm and to be secured a locking means.

* * * * *